Dec. 24, 1929.                E. F. H. ENNA                1,740,580
METHOD AND APPARATUS FOR UNITING CRUDE RUBBER AND LEATHER OR OTHER MATERIAL
                    Filed July 28, 1925        6 Sheets-Sheet 1

Fig.1.

Inventor
E.F.H.Enna
by Knight Brown Quimby May
attys.

Dec. 24, 1929. E. F. H. ENNA 1,740,580
METHOD AND APPARATUS FOR UNITING CRUDE RUBBER AND LEATHER OR OTHER MATERIAL
Filed July 28, 1925    6 Sheets-Sheet 5

Inventor
E.F.H. Enna

Patented Dec. 24, 1929

1,740,580

UNITED STATES PATENT OFFICE

ERNST F. H. ENNA, OF COPENHAGEN, DENMARK

METHOD AND APPARATUS FOR UNITING CRUDE RUBBER AND LEATHER OR OTHER MATERIAL

Application filed July 28, 1925. Serial No. 46,574.

The invention relates to a method of uniting an article composed of "crude rubber" in sheet form with another article which may be of the same material or of a different material, such as leather, and to a machine for practicing the method.

By "crude rubber", I mean any form of dried rubber made from the latex of the *Hevea brasiliensis* and converted into sheets without being vulcanized, the material being suitably condensed or freed from water by evaporation, and in some cases smoked. The trade names of two form of "crude rubber" suitable for use in practicing the invention are crepe rubber, and condensed latex, although I do not limit myself in practicing the method and using the machine hereinafter described to either of these forms.

Since crepe rubber is the form I have thus far used with the best results, I refer specifically thereto in the following description.

The method is especially intended for uniting layers of crepe rubber to constituent parts of footwear, mainly the bottom parts, and may, for example, be used in the manufacture of footwear in which the leather bottom or sole is united to the upper by one or more layers of crepe rubber interposed between the bottom and the upper.

Crepe rubber, which comes from the plantations in sheets, is outwardly covered by a film which prevents adhesion, so that it is essential to penetrate this film to make adhesion possible. Heretofore, the binding power has been called forth or produced by treating the crepe rubber with chemicals, but in practice it was found that such a treatment is not always expedient or reliable, and that it changes in a certain measure the nature of the crude rubber.

According to this invention, therefore, the crepe rubber is not treated chemically, but the film constituting the covering outer layer is roughened or rent in such a manner that it shall no longer prevent adhesion. The roughening or rending may be done by a scouring wheel or a rasp, and in order that it may not diminish the bulk of the crepe rubber, should be executed in such a way that it does not remove the film. If a rotating scouring wheel or rasp is employed, the removal of the film is avoided by moving the crepe rubber past the roughening member in the same direction as that in which the latter rotates, so that the film is not torn off but is only rent or frayed and turned on the sheet, and the latter holds fast the rent and turned particles of the film.

In uniting two crepe rubber sheets their surfaces are thus treated and the union is directly obtained by simply pressing them together, no solution or other means of pasting being employed. In uniting crepe rubber to leather, the former is treated as above and is then placed upon the leather; the surface of the leather is prepared for the union by the application of an adhesive material, and the two parts are pressed together.

The accompanying drawings show a suitable machine, for rending or fraying the film of the crepe rubber in the above-mentioned manner, from which the frayed sheet is conducted to a uniting device, which unites the crepe rubber to the leather, the latter being in this case supposed to form constituent parts of a boot or shoe.

The machine is so constructed that it conducts the crepe rubber past the fraying device to the uniting device, through which the crepe rubber passes at the same rate of movement as the shoe sole, for example, to be united thereto. The fraying ceases when the machine is out of action, so that each time the machine is executing a uniting operation a corresponding amount of crepe rubber is frayed.

The crepe rubber, which is preferably a strip of any suitable width and length, is originally rolled up and is conducted over guide-rolls underneath the rotating fraying member, for example, a scouring wheel, to the uniting device. The latter includes a guide for the strip, a presser-foot, and a hammer which fastens the strip to the material and feeds both the material and the strip.

As the frayed crepe rubber strip is affected by light and changes of temperature, the machine when intended for use in the manufacture of footwear, is so constructed that it can place the crepe rubber strip in a groove previously formed in a sole and prepared for securing the crepe rubber in position, for example by a solution applied to the sole.

The machine has special contrivances for working the two inter-dependent devices, which function between successive uniting operations.

The guide is so constructed that it will always place the strip in the previously formed groove. As it is in some cases impractical to fasten the strip throughout its width to the sole, the hammer is divided in two parts; the part farther away from the edge of the sole being adapted to be rendered inoperative through the agency of a pedal, and simultaneously the corresponding part of the guide, and thereby the strip, is lifted up away from the sole. As it is advisable that this difficult operation takes place at a diminished speed, the working of the pedal also automatically causes the feed of the machine to be reduced by one half.

After the crepe rubber strip is united to the sole in the desired length, the guide is withdrawn from the working material, and a pair of shears, mounted on the machine, are caused to cut off the strip without any changes in the position of the latter.

In the accompanying drawings forming a part of this specification,—

The same reference characters indicate the same parts in all of the figures.

Figure 1:
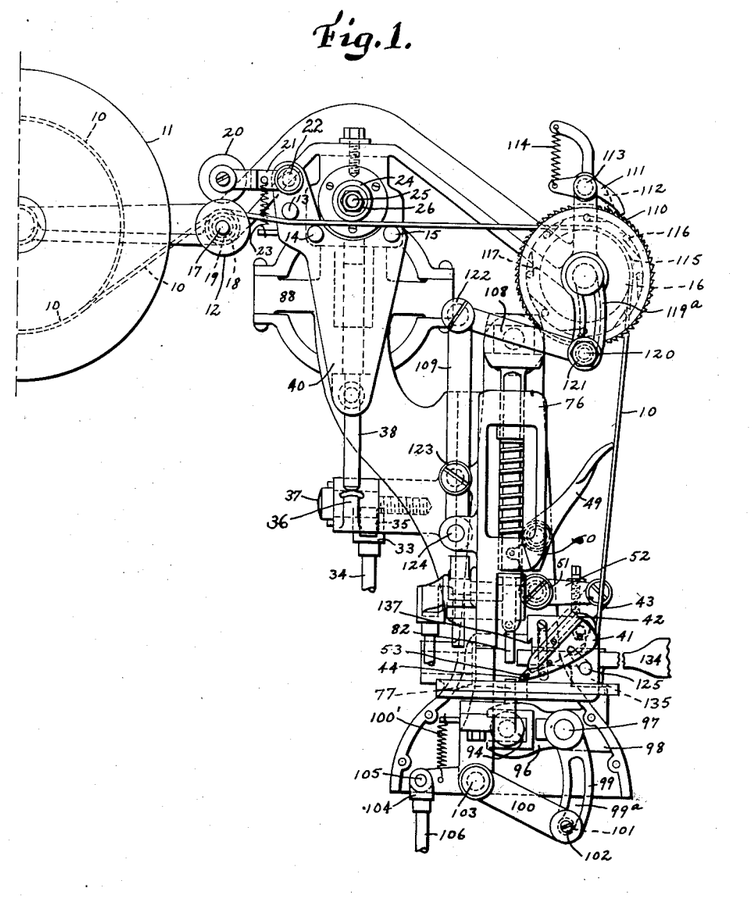
Figure 1 is an end view, showing certain parts of the machine, other parts being omitted.
Figure 4:
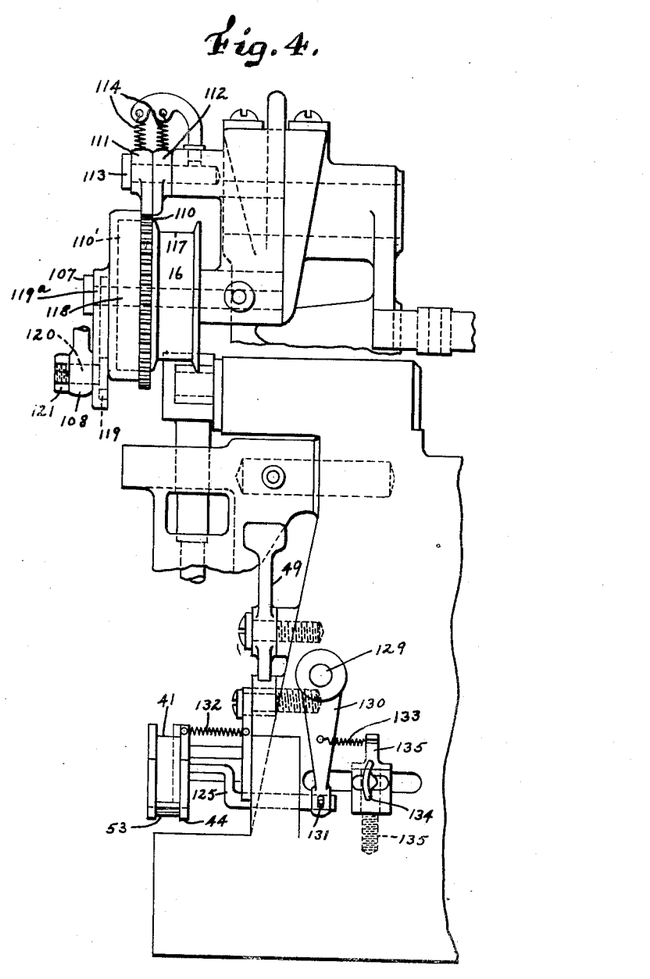
Figure 4 is a fragmentary side view, looking toward the front, and showing parts of the uniting device.
Figure 6:
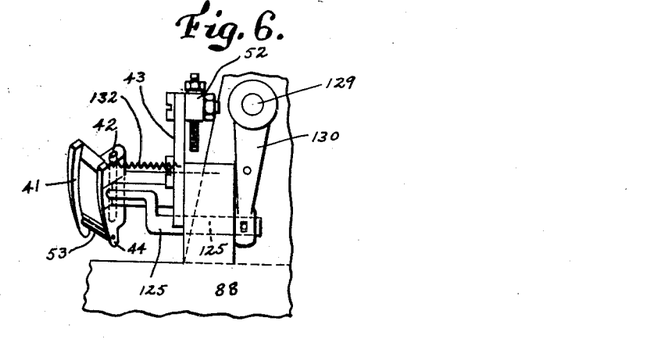
Figure 6 shows the position of the guide when the crepe-rubber strip is fastened by its outer edge only to the sole.

The crepe-rubber strip 10 (Figure 1) placed upon a stock roll 11, is conducted over a guide-roll 12, underneath a roll 13 and over rolls 14 and 15 to a feed-roll 16, from which it passes to the guide 41 (Figures 1, 4 and 6). The guide-roll 12 turns upon an axle 17 and may be checked by a spiral spring brake 18, adjustable by a nut 19. The crepe-rubber strip is pressed against the guide-roll 12 by a revolving roll 20, on an adjustable lever 21, fulcrumed upon an axle 22, and pressed against guide-roll 12 by a spring 23.

Figure 7:
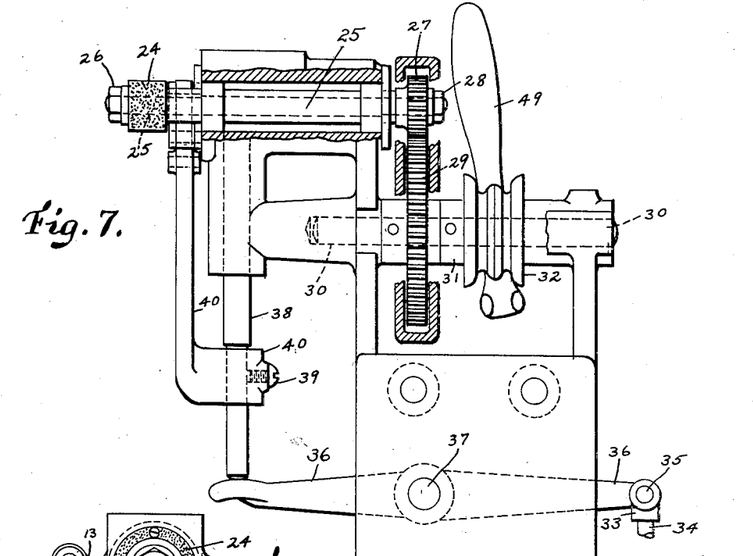
Figures 7 and 8 are side and end views of the fraying device.

The fraying device in the form shown consists of a scouring-wheel 24 (Figures 1, 7 and 8), fixed on a rotating shaft 25 by a nut 26. On the other end of the shaft 25, a nut 28 secures a cog-wheel 27 (Figure 7), which meshes with a larger gear 29, fixed on a shaft 30. On the shaft 30 are mounted a fast pulley 31 and loose pulley 32. By means of a belt shifter 49 a belt (not shown) extending from a main shaft (not shown) may be shifted from one to the other of said pulleys. By this means the scouring wheel 24 is caused to revolve in the same direction as that in which the crepe-rubber strip 10 is conducted through the machine.

Rolls 13, 14 and 15, as well as lever 21, are journaled in bearings in a frame 40 (Figures 1, 7 and 8) which is fixed by means of a screw 39 to a rod 38 movable vertically. The lower end of the rod 38 is supported by one end of a two-armed lever 36, oscillatable upon a pivot 37 the other arm of said lever being connected at 35 with the forked end 33 of a rod 34 which is so connected with the starting pedal of the machine (not shown), that when the machine is started, lever 36 is rocked so that frame 40, and thereby rolls 13, 14, and 15, are moved upwards and the crepe-rubber strip is pressed against the rotary scouring-wheel 24. The fraying operation is then started and is continued until frame 40 is again lowered by releasing the pedal and so stopping the running of the machine.

Figure 2:
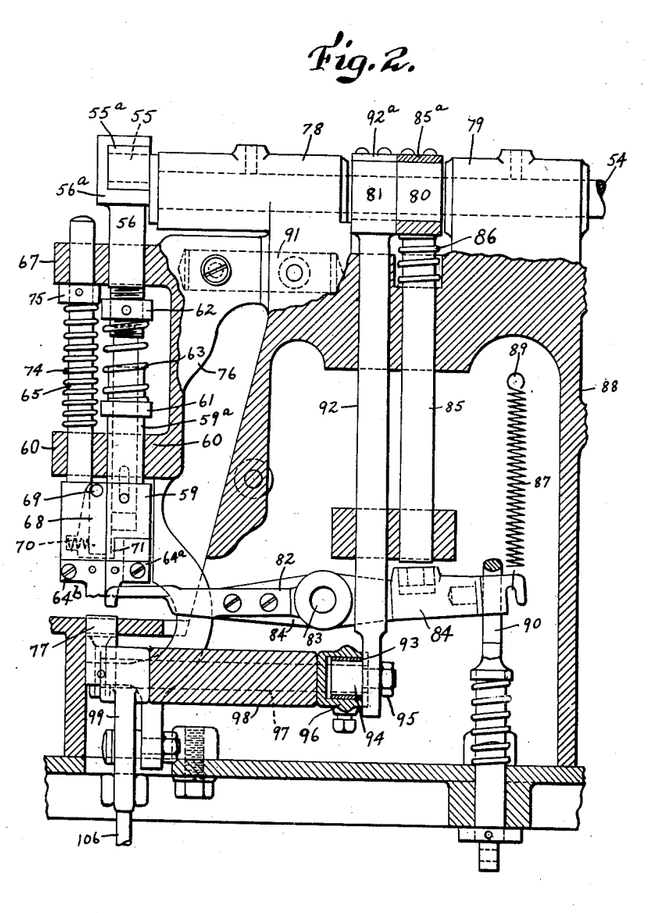
Figure 2 is a side view, looking toward the front side, parts being shown in section.

The main shaft 54 (Figures 2 and 3) carries on its foremost end an eccentric wrist-pin 55 which engages a square pivot block $55^a$ slidable in the grooved head $56^a$ of a rod 56. Said rod is movable by this means in a guide 67 on the hammer-carrier 76 of the uniting device. Movable vertically on the lower end of the rod 56, and in a guide 60, on the hammer-carrier 76 (Figures 2 and 3) is a tubular shank $59^a$ fixed to a hammer-holder 59 (Figure 2). Upon the hammer shank $59^a$ is fixed a head 61 (Figure 2), between which and a nut 62 adjustable on rod 56, is a helical spring 63 imparting to the hammer-holder 59, which holds the two hammer parts next described, a yielding downward pressure, permitting the hammer parts to conform to varying thicknesses of the sole in the machine.

The hammer is divided, and includes a part $64^a$ which is always in an operative position, and a part $64^b$, which may be put out of action. To the hammer-holder 59 is fixed a rod 65, which is movable in the guides 60 and 67 on the hammer-carrier 76. The hammer part $64^b$ may be put into and out of action through a pawl 68, turning on a pivot 69 and pressed toward the part $64^a$ by a spring 70. When in action, the pawl 68 is pressed by the spring 70 into a groove 71 in the hammer-part $64^a$. The pawl 68 may be withdrawn from groove 71 through the agency of a bell-crank lever 73 (Figure 3) turning upon a stud 72, the lever being movable by a pull exerted on a rod 74' therewith connected. The hammer-holder rod 65 is moved up to its topmost position by a spring 74 (Figure 2) on the rod 65, between the bearing 60 and a collar 75, fixed to the rod.

A steel anvil 77 (Figures 1, 2 and 3) placed on the hammer-carrier 76, below the hammer parts $64^a$ and $64^b$ serves to receive the pressure exerted by the hammer parts upon the strip and the sole. When the hammer part $64^b$ has been put out of action, it may be brought into action by releasing the pull-rod 74' and the bell-crank lever 73, so that the pawl 68 again enters the groove 71.

Fixed to the main shaft 54, between the bearings 78 and 79 (Figures 2 and 3), are two eccentrics 80 and 81. The eccentric 80 serves to release a presser-foot 82 (Figures 1 and 2) bearing on the material, and fixed to one end of a two-armed lever 84, fulcrumed upon a fixed stud 83 (Figure 2). The eccentric 80 works upon the lever 84 through the agency of a rod 85, which has a strap $85^a$ embracing the eccentric, the rod being vertically movable by the eccentric. Lever 84 is held in constant touch with the lower end of the rod 85, by a spring 87, one end of which is fastened to lever 84, and the other end to a stud 89 on the frame 88. The spring 87 also causes the presser-foot 82 to bear down against the material. A rod 90 connected to a pedal (not shown) serves to release the presser-foot when the machine is in "stop" position.

Figure 3:
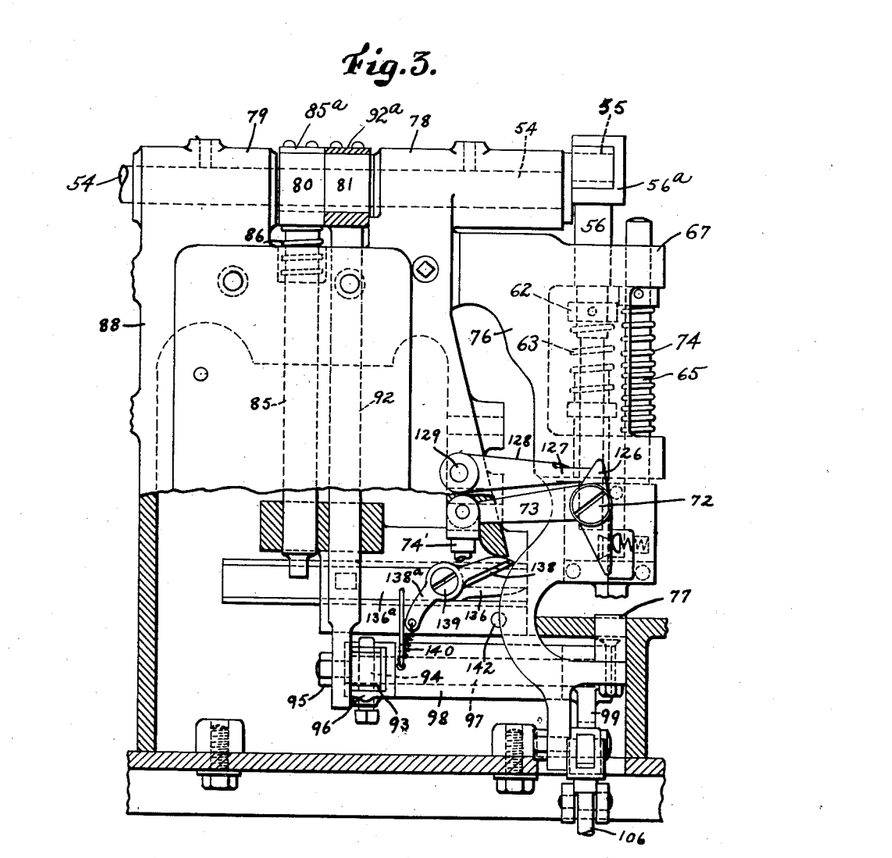
Figure 3 is a view similar to Figure 2, looking toward the rear.

The eccentric 81 (Figure 2) imparts to the hammer-carrier 76 an oscillating movement on a fixed axle 91 upon which it is positioned. For this purpose the eccentric 81 works upon a vertically movable rod 92, having a strap $92^a$ embracing the eccentric, and carrying at its lower end a block 93, a bolt 94 and nut 95 (Figure 3). The block 94 works in a slot in an arm 96 (Figures 1 and 3) which is placed upon an axle 97. Axle 97, which turns in a bearing 98 (Figure 1), carries an arm 99 which is fixed to the axle and has a curved slot $99^a$, fitted for a roll 101, secured to a bell-crank lever 100 by a screw 102. The lever 100 turns on a pivot stud 103, fixed in the hammer-carrier 76, but normally through a spring 100' held in the position shown in Figure 1, where the roll 101 is at the bottom end of the slot $99^a$. The bell-crank lever 100 is connected by a bolt 105 (Figure 1) with the forked end 104 of a rod 106 which is connected with a pedal (not shown), so that by working the pedal, the roll 101 may be moved upward in the slot $99^a$ from the position shown by Figure 1.

When the eccentric 81 in revolving, moves the rod 92 up and down, the axle 97, and thereby the arm 99, are turned forward and backward; this movement through the crank lever 100 is transferred to the hammer-carrier 76, so that the latter is oscillated, its movement in one direction serving to feed the material in the uniting device. By applying pressure to the pedal connected with rod 106, the position of bell-crank lever 100 is, as already mentioned, altered in relation to arm 99, thereby shortening the length of the feed of the material imparted during each oscillating movement of the axle 97.

To place the material in the uniting device, the presser-foot 82 (Figure 2) is lifted by applying pressure to the pedal connected with rod 90, and the material is placed upon the anvil 77. The presser-foot is then lowered by releasing the pedal. The spring 87 causes the presser-foot to adjust itself automatically to the thickness of the material. The feed of the material is regulated in above-mentioned manner by adjusting the bell-crank lever 100.

When the hammer parts $64^a$ and $64^b$ (Figure 2) are moved downwards, they press the foremost part of the crepe-rubber strip, conveyed through the guide 41, down on to the material, and during the forward part of the oscillating movement of the hammer-carrier, the hammer parts carry the material and the crepe-rubber strip forward, the presser-foot 82 during this feeding being disconnected from the working material, so that the feeding may take place without hindrance. The presser-foot again comes into action, as soon as the feeding movement is accomplished and the hammer-carrier starts its receding movement, during which the hammer parts are lifted away from the material.

The hammer-holder 59, above described, is moved up and down in the hammer-carrier 76, by the eccentric wrist-pin 55 and pivot block $55^a$ and the presser-foot 82 is released at predetermined periods by the eccentric 80, these movements being so coordinated that the hammer and the presser-foot have the correct relative movements.

In order that the crepe-rubber strip 10 may be conducted through the fraying device at a rate corresponding to the feed of the material through the uniting device, the feed-wheel 16 is mounted to rotate on an axle 107 (Figure 1) and is connected with the oscillating hammer-carrier 76 through rods 108 and 109. To one side of the feed-wheel 16, which has a central path 117 for the crepe-rubber strip, is affixed a toothed disk 110 (Figures 1 and 4), into which pawls 111 and 112, fixed upon axle 113, are pressed by means of springs 114, so that the feed-wheel 16 can only revolve one way. The disk 110 has a cylindric flange 110' (Figure 4), in the edge of which there are slots 115 (Figure 1) forming bearings for loose rolls or balls 116, constituting elements of a one-way clutch. The flange 110' is enclosed by a loose cap or collar 118 (Figures 1 and 4), closed at its outer side and having on its closed side a projection $119^a$ containing a curved slot 119, in which a bolt 120, positioned upon the end of rod 108 is engaged and can be held in a desired position by a nut 121.

The rod 108 is connected by a bolt 122 with the rod 109, which turns on a bolt or stud 123, fixed to the frame 88. The lower end of the rod 109 is connected by a pivot 124 (Figure 1) with ears on the hammer-carrier 76. When the hammer-carrier is moved forwardly, the rod 109 turns on the bolt 123, and through rod 108 causes the collar 118 to turn, so that the rolls 116, pinched between the collar 118 and the nave 110' of the feed-wheel 16, will cause the rotation of the feed-wheel 16 and carry it forward a distance equivalent to the length which the anvil 77, and thereby the material is fed during the forward movement of the hammer-carrier.

The rod 108, as above stated, is adjustable in the curved slot 119. It is necessary, in feeding a material, such as crepe-rubber, which does not have a constant elasticity, to provide means for adjusting the length of the feed according to the elasticity. This adjustment is permitted by moving the bolt 120 toward or from the center of the feed disk, thereby increasing or diminishing the length of the feed.

Figures 8, 9, 10, 11:
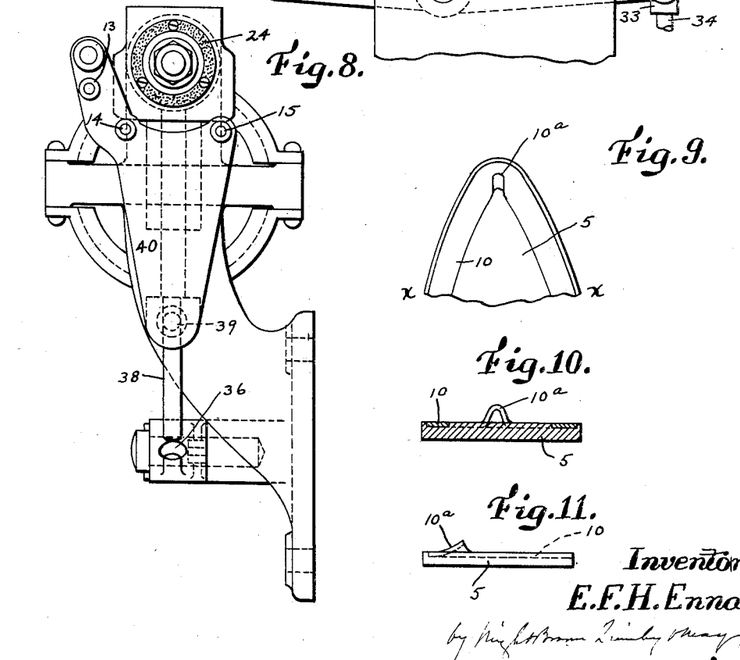
Figures 9, 10 and 11 are respectively, a top view, a section, and a side view of a crepe-rubber strip extending along the sides and around the end of a leather sole and fastened thereto at the outer edge only.

The crepe-rubber strip is guided to the sole by a guide 41 (Figures 1, 4 and 6), which is hung in a bell-crank lever 43, permitting the guide to turn upon an axle 42 around a point 44 as a center, whereby the crepe-rubber strip may be brought into an angular position against the working-material. This is especially important when laying the crepe-rubber strip around the pointed toe of a sole 5 (Figure 9). The circular motion of the guide 41 around the axle 42 is brought about by a crank-lever 125, which exerts a pressure against the inner side of the guide when the lever 73 (Figure 3) is moved downwards, an ear 126, fixed to lever 73 being pressed against an ear 127 on a lever 128, adapted to turn on a fixed stud 129, so that lever 128 is pressed upwards thereby, turning axle 129; the last further carries a lever 130 (Figures 4 and 6) which, by means of a pivot 131, is connected with the crank-lever 125. In this way lever 130, crank-lever 125 and guide 41 are moved forward when lever 128 is pressed upwards. When lever 130 is released, the guide 41 and lever 130 are taken back to their normal positions by springs 132 and 133, respectively.

When the guide 41 in the above-mentioned manner, is turned by moving crank-lever 73 downwards, the crepe-rubber strip 10 is lifted away from the material in such manner that only the strip edge nearer the machine (i. e. the edge of the material) is in contact with the material. The downward movement of crank-lever 73 further (as above said) causes the hammer-part 64$^b$ to stop acting, so that only hammer-part 64$^a$ functions, acting upon the crepe-rubber strip over an area corresponding to its own width, so that the inner edge of an abruptly curved portion of the strip 10 is free to rise and form a loop or plait 10$^a$ as shown by Figures 9, 10 and 11.

The plate 10$^a$ may be cut away flush with the flat portion of the strip by any suitable means.

When the laying operation is finished the crepe-rubber strip united to the sole is cut off by means of a cutting device including a lower shear blade 136 (Figure 3), and an upper shear blade 138. The cutting device is adapted to act between the presser-foot 82 and the guide 41 by working a handle 134 (Figures 1 and 4), which turns on a pivot 135 and engages the lower blade 136 (Figure 3), which is fixed to a slide 136$^a$, shiftable in a slot 137 (Figure 1) in frame 88. The top blade 138 (Figure 3) is connected to blade 136 by a pivot 139 and is normally kept open by a spring 140. When the shears through working the handle 134 moves forward, a stud 142 acts upon an ear 138$^a$, fixed to the upper blade 138, so that the shears close and cut off the crepe-rubber strip. After cutting, the shears are drawn back by a spring not shown.

By cutting the crepe-rubber strip directly in front of the guide 41, waste of rubber material is avoided, and the machine is at once ready for starting a fresh operation, because the grooved roll 53 fixed at the foremost end of guide 41 (Figures 1, 4 and 6) grips the crepe-rubber strip 10.

Figure 5:
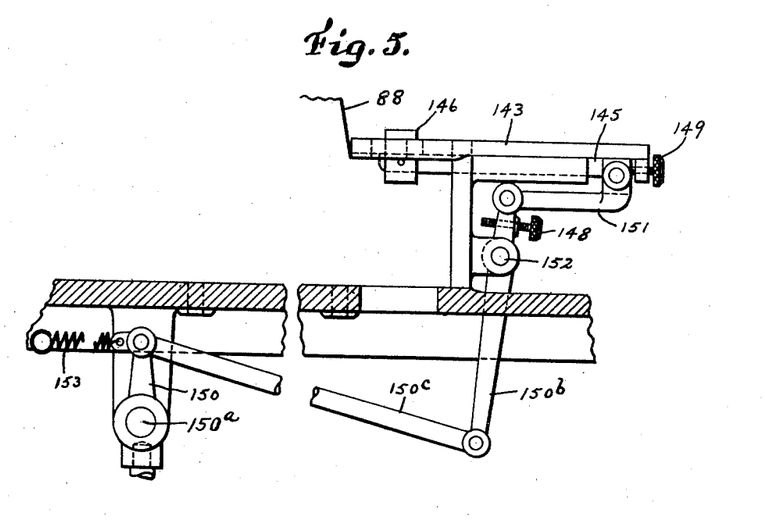
Figure 5 shows certain details of the machine.

In the work-table 143 (Figure 5) which is fastened to the frame 88, there is a ruler 146, movable in a cut-out opening or slot in the work-table, and fixed upon a rod 145, the ruler serving as a fixed rest for the sole. The ruler is connected by a knee-regulator 151, a crank lever 150$^b$, fulcrumed at 152, and a link 150$^c$ with a crank-lever 150 revolving upon pivot 150$^a$ and normally held by a spring 153 in the position shown in Figure 5, in which position the end of rod 145 rests against a screw 149, the adjustment of which effects the regulation of ruler 146 in proportion to guide 41. The crank-lever 150 through a knee-lifter or the like (not shown) can be shifted against the stress of the spring 153, so that the ruler 146 is shiftable horizontally, the extent of this movement being determined by adjustment of the screw 148. When the knee-lifter is released, the spring 153 carries the parts back to normal position. The herein described contrivance enables the operator to vary, during the operation, the distance at which the strip is positioned from the edge of the sole, without liability of failure to lay the strip in accordance with the groove prepared for it in the sole.

To prevent the crepe rubber strip 10 from being injuriously affected by the action of light when the strip is used in an article of footwear, I form and arrange the guide 41 so that it places the strip in a groove (Figures 9 and 10) previously formed in the sole 5. I also form and arrange the presser foot 82 so that it presses the strip into the groove. The bottom and edges of the groove cover the inner side and edges of the strip. In the completed shoe, the outer side of the strip is covered by another structural part or parts of the shoe, so that light is entirely excluded from the strip. Before applying the strip, an adhesive material is placed in the groove.

As implied by the opening portion of this specification, the invention is not intended to be limited to the use of the particular form of crude sheet rubber, known as crepe rubber. Of course, the details of construction above mentioned may be varied without deviating from the principle of the invention; they are, therefore, merely to be considered as a form of execution for the invention.

I claim:

1. A machine for uniting a crude rubber strip with a body member such as a sole, comprising a fraying or rending mechanism, means for effecting relative movement between a strip of crude rubber and said mechanism to fray one side of the strip, means for feeding the strip and the body member at the same speed and in the same direction, with the frayed side of the strip in contact with the body member, and means for applying pressure to the superposed sections of the strip and body member.

2. A machine as specified by claim 1, comprising also means for rendering the fraying mechanism and the pressing mechanism simultaneously operative or inoperative.

3. A machine as specified by claim 1, comprising also a guide adapted to normally position a section of the strip to contact throughout its width with the body member, and means for adjusting said guide to cause one edge portion only of the strip to contact with the body member.

4. A machine as specified by claim 1, comprising also a guide adapted to normally position a section of the strip to contact throughout its width with the body member, means for adjusting said guide to cause one edge portion only of the strip to contact with the body member, and means for severing the strip transversely in rear of the pressure means, the guide including a grooved roll adapted to hold the foremost end of the rubber strip in rear of said line of severance.

5. A machine as specified by claim 1, the means for applying pressure including a strip-laying hammer comprising two parts adapted to collectively cooperate with the strip throughout its width, and means for rendering one of said parts inoperative, whereby only one edge portion of the strip will be caused to unite with the body member.

6. A machine as specified by claim 1, the pressure applying means including a strip-laying hammer divided into two parts adapted to collectively cooperate with the strip throughout its width, means for rendering one of the hammer portions inoperative, whereby only one edge portion of the strip will be united with the body member, and means for simultaneously shortening the extent of movement of the feeding devices.

7. A machine as specified by claim 1, the pressure applying means including a strip-laying hammer and means for yieldingly pressing said hammer against the strip.

8. In a machine for the purpose described, the combination of means for mechanically fraying one face of a strip of crude rubber, means for applying pressure to the strip and a body member, such as a shoe sole, positioned in contact with the frayed surface of the strip to unite said strip and member, means for feeding the strip and body member past the pressure means, and means for severing the strip beyond one end of the body member.

9. A machine for uniting a crude rubber strip with a sole, comprising in combination a fraying or rending mechanism adapted to mechanically fray one side of the strip, means for feeding the strip and the sole at the same speed and in the same direction, with the frayed side of the strip in contact with the sole, a guide cooperating with the feeding means to place the strip in a groove previously formed in the sole, and a pressed foot adapted to press the strip into said groove, the arrangement being such that the frayed side of the strip contacts with the bottom of the groove, and the edges of the strip contact with the edges of the groove, so that in a completed shoe light is entirely excluded from the strip.

10. The herein described method of uniting a crude rubber strip with a shoe sole, which consists in mechanically rending or fraying one side of the strip, forming a groove in the sole, placing the strip in the groove with the frayed side of the strip in contact with the bottom of the groove, and the edges of the strip in contact with the edges of the groove, whereby when the sole becomes a part of a completed shoe, light is excluded from all parts of the strip, and applying pressure to cause the strip to adhere to the sole.

11. In a machine for the purpose described, the combination of means for mechanically fraying one face of a strip of crude rubber, a pressure member, means for feeding the strip and a body member, such as a shoe sole, past the pressure member with the frayed face of the strip in contact with the body member, and means for actuating the pressure member to effect a union of the strip and body member.

12. In a machine for the purpose described, the combination of a means for mechanically fraying one face of a strip of crude rubber, a pressure member adapted to effect a union between a frayed section of the strip and a body member, such as a shoe sole, means for feeding the frayed strip and body member past the pressure member with the frayed face in contact with the body member, and means for simultaneously rendering the fraying means and pressure member inactive.

13. In a machine for the purpose described, the combination with means for feeding a strip of crude rubber, a rotary tool positioned to mechanically fray one face of the strip as it is fed past said tool, and a pressure member adapted to force the frayed section of the strip against a body member, such as a shoe sole, to effect a union with said body member of the section of the strip in alignment with the pressure member.

In testimony whereof I have affixed my signature.

ERNST F. H. ENNA.